C. E. C. EDEY.
AUTOMOBILE LOCK.
APPLICATION FILED JULY 7, 1915.
1,155,902.
Patented Oct. 5, 1915.
2 SHEETS—SHEET 1.
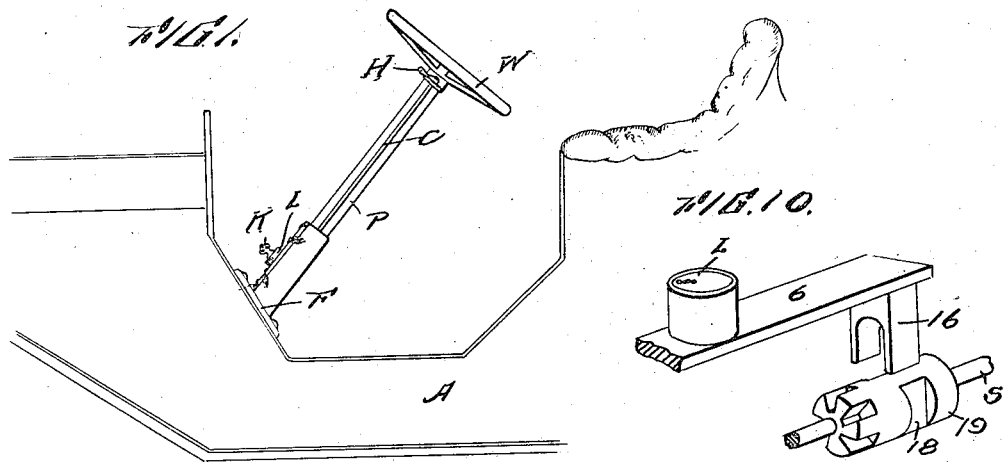
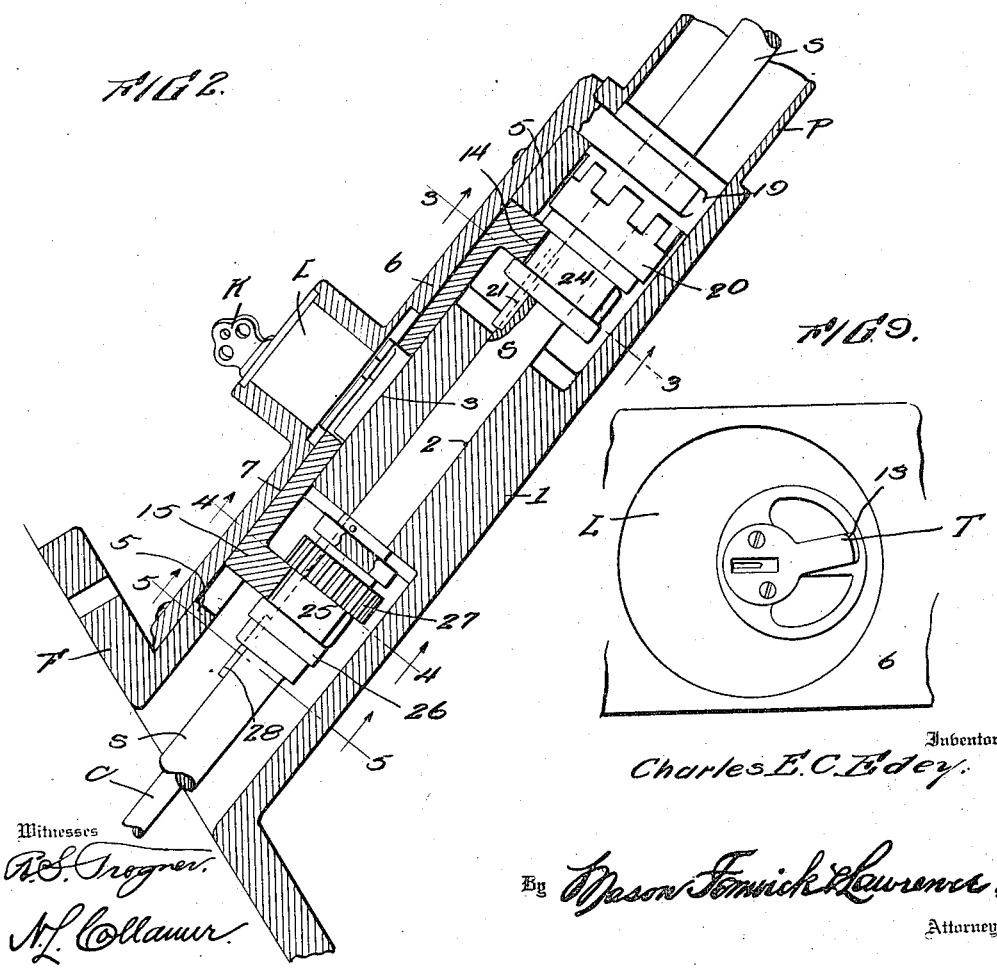
Inventor
Charles E. C. Edey.
By Mason Fenwick & Lawrence,
Attorneys

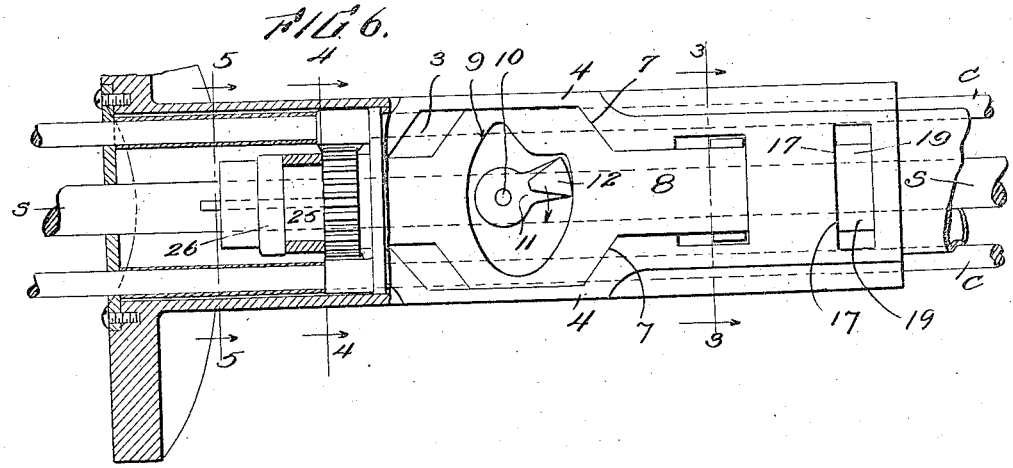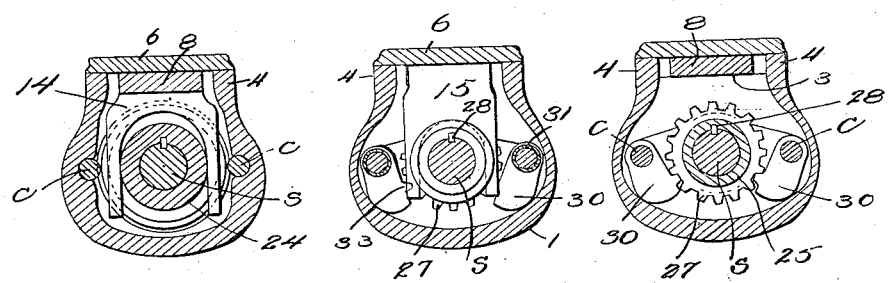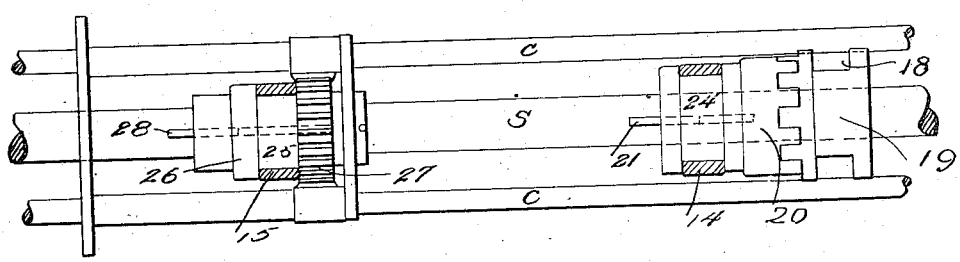

UNITED STATES PATENT OFFICE.

CHARLES E. C. EDEY, OF TACOMA, WASHINGTON, ASSIGNOR OF ONE-HALF TO TOM BURR BONHAM, OF TACOMA, WASHINGTON.

AUTOMOBILE-LOCK.

1,155,902.  Specification of Letters Patent.  Patented Oct. 5, 1915.

Application filed July 7, 1915. Serial No. 38,476.

*To all whom it may concern:*

Be it known that I, CHARLES E. C. EDEY, a citizen of the United States, residing at Tacoma, in the county of Pierce and State of Washington, have invented certain new and useful Improvements in Automobile-Locks; and I do hereby declare the following to be a full, clear, and exact description of the invention, such as will enable others skilled in the art to which it appertains to make and use the same.

This invention relates to locks, and more especially to those adapted for use on automobiles; and the object of the same is not only to improve the construction of the locking devices themselves, but also to provide means whereby the user cannot lock the steering rod until he has turned both control rods to positions whereby the engine cannot be started. These objects are carried out by a construction typically illustrated in the accompanying drawings wherein:

Figure 1 is a side elevation of part of an automobile showing the preferred position occupied by the locking device. Fig. 2 is an enlarged central vertical section through the lower end of the steering post and the locking device, showing the parts of the latter in locked position; and Figs. 3, 4 and 5 are cross sections on the lines 3—3, 4—4, and 5—5 respectively of Fig. 2. Fig. 6 is a plan view partly in section showing the parts which underlie the base plate, the latter in this case being removed, and Fig. 7 is a plan view of the various rods and the parts connected therewith. Fig. 8 is a detail of one of the control rods and its dog. Fig. 9 is a bottom plan view of a portion of the base plate, showing a portion of the lock. Fig. 10 is a reduced perspective detail of part of the base plate and the fixed clutch member with which it engages when in place.

Attached to the floor of the ordinary automobile A is a floor plate F from which rises obliquely the tubular steering post P containing the steering rod S which has a hand wheel W at its upper end, and alongside and sometimes within said post extend the control rods C for the spark and throttle, said rods having levers or handles H at their upper ends. No novelty is claimed for these parts nor for anything described in this specification by means of reference letters. I propose to attach to said post at a suitable point my automobile lock, and as shown herein I preferably locate its casing immediately above the floor plate F and will probably cast it as part thereof, cutting off the tubular post P and attaching it to the upper end of said casing by suitable means. However, it is quite possible to locate the casing at some other point on the post, although this need not be elaborated. The type of lock L and its key K is not important, excepting that it should have a tumbler T which is rotated by the turning of the key as will be clear without further explanation. Automobile locks of this character have heretofore been made by means of which the operator can lock the steering rod when he leaves his car, with the result that when an unauthorized person starts the motor and car the latter will travel straight ahead and the thief cannot get far away without trouble. Automobile locks have also been proposed for locking other parts of the mechanism, but in the present case I propose to lock the steering rod by a device which the owner himself cannot operate until he has set the handles H of the control rods in such position that the engine cannot be started—hence the thief cannot even start the car.

My invention is applicable to nearly all the types of automobiles now on the market, either at the lower end of the steering post P as shown or elsewhere, and the manner in which it is installed need not be amplified.

While I have shown a lock L having a removable key K, it is quite possible that a permutation lock might be employed if desired.

Coming now to the details of the invention, the casing 1 is herein shown as of nearly cylindrical cross section, connected at its lower end with the floor plate F, and at its upper end with the tubular post P, at about the center of its length it contains a bearing 2 for the steering rod S, which bearing has a flat upper face 3, and its side and end walls 4 and 5 rise above said face and are overlaid by a base plate 6 which carries the casing of the lock L as shown in Fig. 2. Between said upper face 3 and the lower face of the base plate is therefore produced a chamber 7 in which moves a slide 8 which might be said to constitute the lock-bolt. This slide is provided with a cam opening 9 whose shape is best seen in Fig. 6, and pivoted at 10 upon the face 3 of the bearing is a cam 11 which moves within said opening and has at its outer end an upstanding lug 12 against whose sides strikes a depending lug 13 at the outer end of the tumbler T, when the latter is turned by the key or otherwise in the manipulation of the lock. The shape of the cam opening 9 is such that said cam swings through nearly a complete circle, and as it swings it reciprocates the slide within the chamber 7, moving it first upward and then downward over the flat face 3. Yet it is quite possible to remove the base plate 6 and with it the lock and tumbler, and at that time the mechanism of this locking device is exposed for cleaning and repair. I do not desire to be limited in this respect, however, for the tumbler T might be given such configuration that it would serve in place of the cam, but I believe the construction shown and described would be preferable because it permits the employment of many different forms of locks, so long as the lug on the cam is shaped to engage with the lock tumbler. At suitable points on the slide 8 are formed yokes 14 and 15 which pass down into the casing 1 at opposite ends of the bearing 2 and are spaced from each other about as shown in Fig. 2, and when the slide is moved these yokes actuate the devices yet to be described. When the base plate is removed it is quite obvious that the slide and its yokes may be lifted out of place. Depending from the base plate near its upper end is another yoke 16 which, when this plate is put in position, passes down through an opening 17 in the top of the casing 1 and engages notches 18 in opposite sides of a fixed clutch member 19 through which the steering rod S passes loosely and which therefore may serve as a bearing for said rod.

A movable clutch member 20 is splined on the rod S as shown at 21 and provided with an annular groove 24 with which the yoke 14 engages. This clutch is shown at the upper end of the locking device in Fig. 2. The other yoke 15 engages a groove 25 in the hub 26 of a gear 27 which is splined as at 28 on the rod S; and this gear is shown at the lower end of Fig. 2, although it is quite obvious that the clutch and gear could be reversed in position if desired. When the slide or bolt 8 is moved upward to the position shown in Fig. 2, the clutch members 19 and 20 are engaged and therefore the steering rod S carrying the movable member 20 is locked to the fixed member 19, which latter is held against rotation by the yoke 16 and base plate 6. Meanwhile the yoke 15 slides gear 27 on its spline 28 for a purpose which I will now explain.

Carried by each control rod at a proper point is a dog 30, shown in Fig. 8 as fixed to a sleeve 31 which in turn is fixed as at 32 to the rod C, and this dog preferably has a tooth 33 on its inner face, or that face nearest the gear 27 as best seen in Figs. 4 and 5. The sleeve (and therefore the dogs) are so set on the control rods C that the gear 27 can be moved between said dogs as seen in Fig. 4 only when they are swung outward by turning the throttle and spark handles H to what might be called their "inoperative" position, that is, to an extreme where the engine cannot be started. In other words, to advance the throttle so as to admit gas to the engine and to advance the spark to a point where the explosions will occur properly, the handles H will have to be moved and therefore the dogs 30 will have to swing inward from the position shown in Fig. 4.

Thus it will be seen that with this improved locking device, the operator inserts and rotates the key K or otherwise moves the tumbler T of the lock L, the tumbler swings the cam 11 and the latter moves the slide or bolt 8. One yoke 14 draws the movable clutch member 20 down out of engagement with the fixed clutch member 19, while the other yoke 15 slides the gear 27 down from its position between the two dogs 30. The operator can now turn the handles H, and when the engine is cranked it will start; and as soon as he throws in his clutch, he can steer the car by the wheel W. On the other hand when his car comes to rest, and he desires to lock the steering rod S, he must turn the handles outward or to "inoperative" position in order to throw the dogs 30 away from the gear as seen in Fig. 4; then he turns the lock and its tumbler, and through the cam 11 the slide or bolt 8 is moved to the position shown in the drawings, and such movement engages the clutch members and slides the gear between the dogs. At this time the clutch members lock the steering rod S against rotation, and the teeth 33 of the dogs 30 engage the teeth on the gear 27 and serve as an additional lock. Hence it will be quite obvious without further illustration that the clutch elements could be entirely omitted if the dogs are provided with teeth 33, although in that case it might be desirable to provide each dog with more than a single tooth and perhaps make these parts a little larger and stronger. However, either construction effects the desired end and object as first above stated, viz: that the operator cannot lock the steering rod until he has set the spark and throttle to inoperative positions, and therefore neither he nor any one else can start the engine without first unlocking this device.

What I claim is:

1. The combination with the steering and control rods of an automobile; of means for locking one rod against rotation including a member moving in one path from locked to unlocked position, and means for locking the other rod against rotation including a second member moving from locked to unlocked position in another path intersecting the path of the first member.

2. The combination with the steering and control rods of an automobile; of means for locking one rod against rotation including a member sliding in one path from locked to unlocked position, and means for locking the other rod against rotation including a second member swinging from locked to unlocked position in another path intersecting the path of the first member, one member being held in locked position by the other when the latter also stands in locked position.

3. The combination with the steering and control rods of an automobile; of means for locking the steering rod against rotation including a sliding member, and means for locking the control rods including dogs swinging across the path of movement of said member and held in locked position by such member when it also stands in locked position.

4. The combination with the steering and control rods of an automobile; of means for locking the steering rod against rotation including a sliding member, and means for locking the control rods including dogs swinging across the path of said member and fast on the control rods in position to hold the spark and throttle inoperative when said member stands between the dogs.

5. The combination with the steering and control rods of an automobile; of a gear splined on the steering rod, manually operable means for sliding it, dogs fast on the control rods and swinging into the path of said gear, and teeth on the dogs adapted to be engaged by those on the gear when the dogs are swung to position where the spark and throttle are inoperative and the gear is slid into position between said dogs.

6. The combination with the steering rod of an automobile, and the spark and throttle control rods alongside the same; of a fastening device therefor comprising a casing, a slide movably mounted therein and having a yoke, a lock for moving the slide, a gear splined on the steering rod and having a grooved hub engaged by said yoke, dogs fast on the control rods and swung by them into the path of said gear, and teeth on the dogs adapted to engage those on the gear when the control rods are turned to position where the spark and throttle are inoperative and the gear is slid to position between said dogs.

7. The combination with the steering and control rods of an automobile; of a fastening device therefor comprising a casing having a flat top and upright walls alongside the latter, a slide movably mounted on said top and having a cam opening, a cam pivoted to the casing within such opening and having an upstanding lug, a base plate resting on the walls over the slide, a lock carried by the base plate, a lug on the lock-tumbler coacting with that on the cam, a sliding locking member splined on the steering rod, connections between it and said slide, and swinging locking members fast on the control rods and movable across the path of said sliding member, substantially as described.

8. The combination with the steering and control rods of an automobile; of a fastening device therefor comprising a casing containing a longitudinal chamber, a bearing for the steering rod located within the casing and having upright notches, a slide movably mounted in said chamber and having a depending yoke, a base plate forming the top of the chamber and having a depending yoke engaging said notches, the lock proper mounted on said base plate, connections between it and the slide for moving the latter as the lock is turned, locking means splined on the steering rod and engaged by the yoke on the slide, and other locking means fast on the control rods in position to hold the spark and throttle inoperative when said sliding locking means stands between them.

9. The combination with the steering rod of an automobile, and the tubular post therefor; of a fastening device comprising a casing alined with the post, a fixed clutch member in the casing having upright notches in its sides, a plate overlying the casing and having a yoke engaging said notches, a lock mounted on the plate, a slide in the casing beneath the plate and actuated by the movements of said lock, yokes depending from said slide, a movable clutch member splined on said shaft and engaged by one of the yokes, and an additional locking member splined on the shaft and engaged by the other of said yokes.

10. The combination with the steering and control rods of an automobile, the tubular steering post, a casing alined therewith, a fixed clutch member within the casing, a top plate for the casing having a depending element engaging said member, and a lock on said top plate; of a slide movable beneath said plate and actuated by the turning of said lock, two yokes depending from the slide, a movable clutch member splined on the steering rod and engaged by one of said yokes, a second locking member also splined on said rod and engaged by the other yoke, and locking members fast on the control rods and swinging into the path of the last-named sliding member, substantially as described.

11. The combination with the steering rod of an automobile, the spark and throttle control rods alongside the same, the tubular steering post, a casing alined therewith and inclosing said rods, and a lock mounted on the top plate of said casing; of a fixed clutch member within the casing, a slide in said casing having two depending yokes, a movable clutch member splined on the steering rod and engaged by one of said yokes, a gear splined on the same rod and having a grooved hub engaged by the other of said yokes, and a pair of dogs fast on the control rods and having teeth adapted to engage those on the gear when said rods are turned into position where the spark and throttle are inoperative and the gear is slid into position while the steering rod is locked.

In testimony whereof I affix my signature in presence of two witnesses.

CHARLES E. C. EDEY.

Witnesses:
VAN M. DOWD,
T. B. BONHAM.